Sept. 15, 1953 W. R. HEWLETT ET AL 2,652,511

HIGH-FREQUENCY GENERATOR

Filed March 6, 1950 2 Sheets-Sheet 1

INVENTORS
William R. Hewlett
Howard M. Zeidler
BY Flehr & Swain
ATTORNEYS

INVENTORS
William R. Hewlett
Howard M. Zeidler
BY Flehr & Swain
ATTORNEYS

Patented Sept. 15, 1953 2,652,511

UNITED STATES PATENT OFFICE 2,652,511

HIGH-FREQUENCY GENERATOR

William R. Hewlett and Howard M. Zeidler, Palo Alto, Calif., assignors to Hewlett-Packard Company, Palo Alto, Calif., a corporation of California Application March 6, 1950, Serial No. 147,870

6 Claims. (Cl. 315—1)

This invention relates generally to high frequency electrical generators of the type commonly known as reflex klystron oscillators.

Reflex klystron oscillators have commonly utilized resonators of the coaxial type, having a cylindrical outer conductor. For the higher frequencies of operation, such as from 4000 to 8000 megacycles, such a resonator must have a relatively small internal diameter, and this imposes a limitation upon the oscillator design, particularly in that no adequate space is afforded for accommodating supplemental electrical devices, such as means to suppress an undesired cavity mode of oscillation. In addition prior reflex klystron oscillators have not been provided with adequate means for suppressing a cavity mode which tends to interfere with the desired mode of operation, particularly where the oscillator must be capable of adjustment to operate at a selected frequency over a relatively wide frequency range. Assuming for example that an oscillator is designed to operate upon the ¾ wavelength cavity mode of the cavity resonator, it is recognized that the 5⁄4 wavelength cavity mode may cause interference, and that it is desirable to suppress the 5⁄4 mode where the frequency of operation is over a range of say from 4000 to 8000 megacycles.

It is an object of the present invention to provide a reflex klystron oscillator which makes use of a cavity resonator of special construction which affords ample space for the mounting of special elements or devices.

Another object of the invention is to provide an oscillator of the above type having novel means for suppressing an undesired cavity mode of oscillation and which will be adjustable to enable operation over a wide frequency range.

Another object of the invention is to provide an oscillator of the above type which is well adapted for use with very high frequency signalling equipment, and which will afford stable operation with a minimum amount of frequency interference for a wide range of frequency adjustment.

Additional objects of the invention will appear from the following description in which the preferred embodiment of the invention has been set forth in detail in conjunction with the accompanying drawing.

Referring to the drawing—

Figures 1, 2:
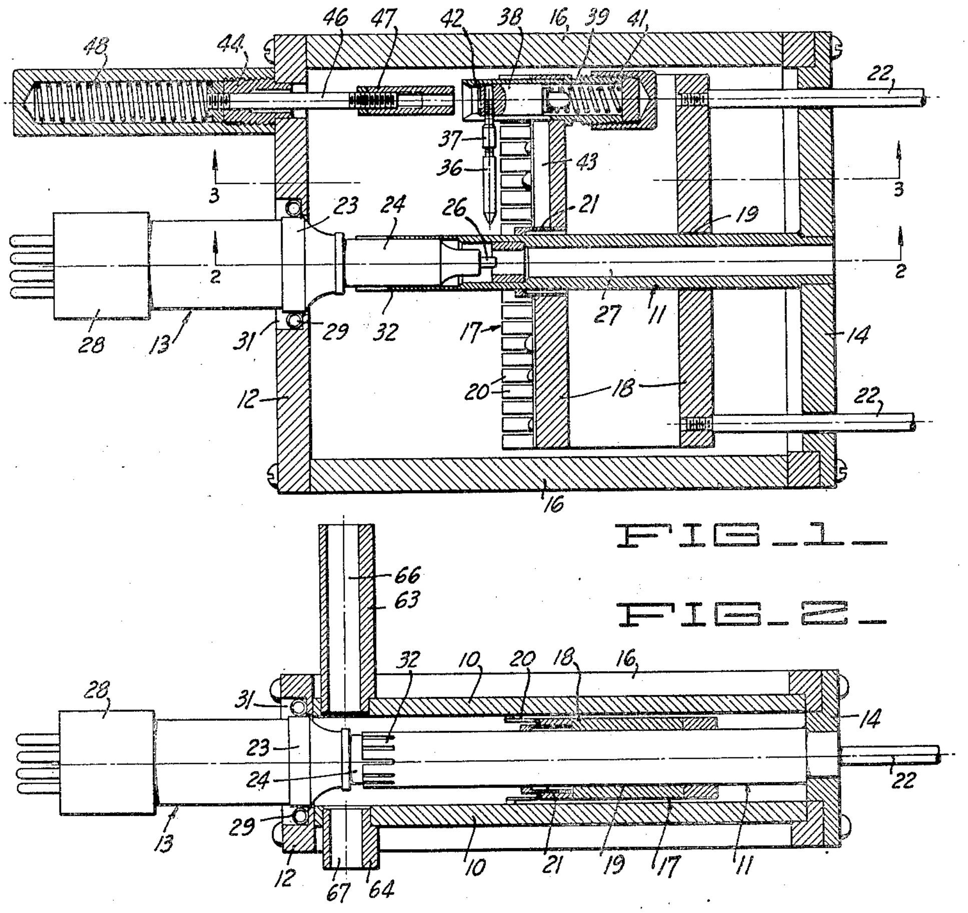
Figure 1 is a side elevational view in section illustrating a high frequency electrical generator incorporating the present invention.
Figure 2 is a cross-sectional view taken along the line 2—2 of Figure 1.
Figure 3:
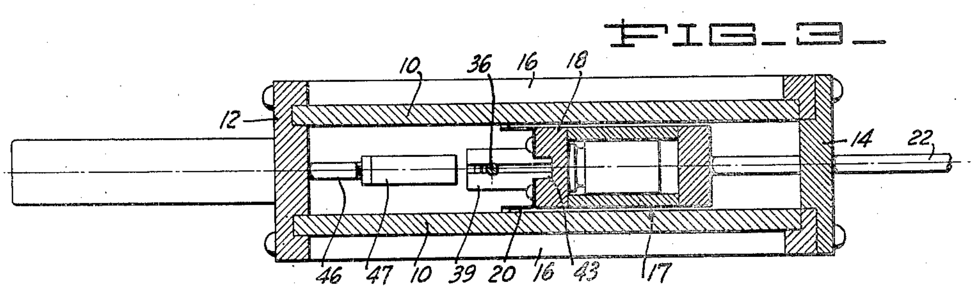
Figure 3 is a cross-sectional view taken along the line 3—3 of Figure 1.

In general the present invention comprises a cavity resonator having means for receiving a vacuum tube of the reflex klystron type, such as the tube known by manufacturers' specifications as No. 5721 (Raytheon). A special form of cavity resonator is employed, and for a portion of the permissible frequency range of operation, special means is employed to suppress the 5⁄4 wavelength cavity mode.

Referring first to Figures 1 to 5 of the drawing, the cavity resonator employed consists of the conducting plates or slab-like walls 10, together with a central conductor 11. The two plates 10 are parallel, and also parallel to and equally spaced from the axis of the center conductor 11.

The margins of the walls 10 extend for a substantial distance beyond the sides of the center conductor 11, as viewed in Figure 1. Thus one obtains the effect of a slotted outer conductor, with the electromagnetic field being relatively intense in the region surrounding the center conductor, and decreasing rapidly toward the side edges of the walls 10. In actual practice it is desirable that the lateral extent of each wall 10 be more than twice the spacing between the walls.

At the forward end of the cavity the walls 10 are attached to the metal end wall 12, which forms a mounting for the reflex klystron tube 13. Also it is desirable to provide a rear metal wall 14, which forms a mounting for the adjacent end of the center conductor 11.

The two side edges of the cavity may be open, but are preferably closed by the walls 16.

An adjustable plunger 17 is fitted within the cavity to enable adjustment of the frequency of operation. This plunger consists of a metal body 18, which has a center opening 19 to accommodate the center conductor 11. The forward end portion of the plunger carries spring finger contacts 20, which have good electrical contact with the inner surfaces of the walls 10, and like contacts 21 which engage the center conductor 11. Rods 22 extend through the end wall 14 and are attached to the plunger to enable adjustment to a desired position.

The klystron tube 13 may be of conventional construction and includes a heated cathode, a control grid, a repeller or reflecting electrode, and two resonator grids which are interposed between the cathode and the repeller. One grid is connected to the terminal ring 23, and the other to a cylindrical terminal 24. The repeller is connected to the end terminal 26, which can connect to a conductor extending through the bore 27 formed in the center conductor 11. The base 28 of the tube carries the usual terminals for making connection to the cathode and to the cathode heater.

When the tube 13 is in normal position as illustrated in Figures 1 and 2, the terminal ring 23 is engaged by the coiled wire spring 29, which is retained within an annular recess 31 formed in the wall 12. The end portion 32 of central conductor 11 is slotted as shown and the cylindrical terminal 24 is received within this slotted end portion, thereby forming an electrical connection between cylindrical terminal 24 and the end portion 32.

Assuming a range of movement of the plunger 17 to secure a wide frequency adjustment of say from 4000 to 8000 megacycles, for a substantial portion of this frequency range, as for example 4000 to 5500 megacycles, there is a tendency toward cavity mode interference. We have found it desirable to operate upon the ¾ wavelength cavity mode, and for that portion of the frequency range mentioned, there is serious interference by the 5/4 wavelength cavity mode. We provide means on the plunger 17 to suppress the 5/4 wavelength cavity mode, and a particular feature of this means is that it is automatically retracted and made ineffectual for a portion of the frequency range for which it is not required, and for which it might interfere with operation upon the desired mode.

The mode suppressing means which we employ consists of a probe 36 which is preferably in the form of a pin made of lossy or dissipational material. It may for example be made of dielectric material such as a molded phenolic condensate product, coated with carbon to provide substantial ohmic resistance. One end of the pin 36 terminates a short distance from the central conductor 11, and the other end is secured to a shank 37, which is secured to member 38. Member 38 is slidably fitted within the slotted guide sleeve 39 which is carried by the body of the plunger 17. Member 38 is urged by compression spring 41 to the position shown in Figure 1, in which it engages the limiting shoulder 42. When member 38 is moved toward the body of the plunger 17, the pin 37 may assume a position in which it is accommodated in a recess 43 which is formed in the adjacent face of the plunger body 18.

Mounted upon the forward wall 12 there is a stud 44 which is bored to receive the rod 46. One end of this rod carries the member 47, which is adapted to engage the member 38. The other end of the rod is urged by the compression spring 48 toward the position illustrated in Figure 1.

Spring 48 is stronger than spring 41 and, in its extended position, exerts more force than does spring 41 in its fully compressed position. Hence, when plunger 17 is moved to the left from the position shown in Figure 1, member 38 is brought into engagement with member 47 with the result that no movement of member 47 or rod 46 occurs, and no compression of spring 48 occurs, until movement of plunger 17 has caused the probe 36 to become fully retracted into recess 43 and the spring 41 to become fully compressed. At this point of movement of plunger 17, then, spring 48 is fully extended, spring 41 is fully compressed, and probe 36 is fully retracted into recess 43. As movement to the left of plunger 17 continues beyond this point, movement of member 47 and rod 46 and compression of spring 48 begins, and for movement of plunger 17 from this point to its limit of movement to the left toward metal end wall 12, the probe 36 is thus in its fully retracted position within recess 43.

Figures 4, 5, 6, 7:
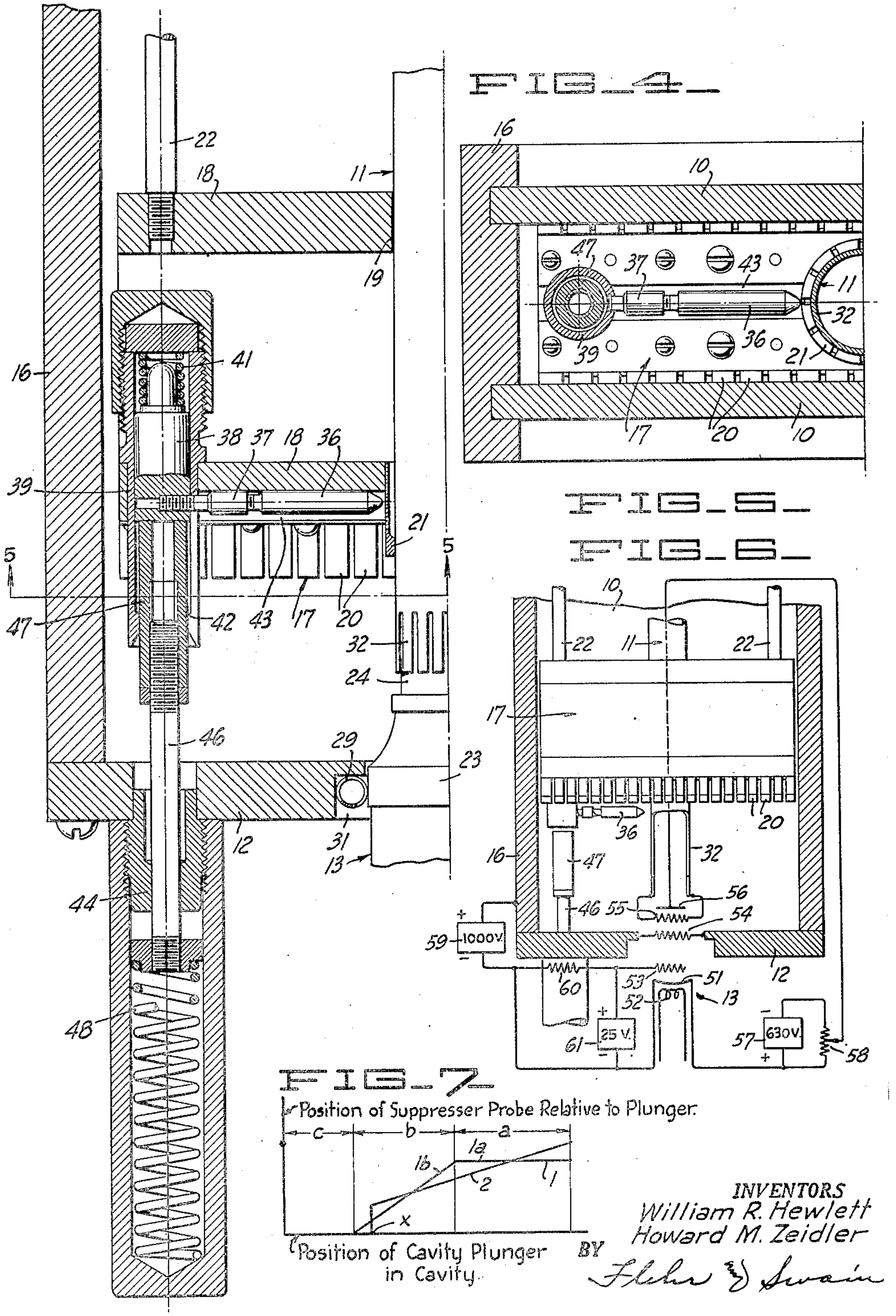
Figure 4 is an enlarged cross-sectional detail illustrating the mode suppressing means employed, and the elements used for its automatic adjustment.
Figure 5 is a cross-sectional detail taken along the line 5—5 of Figure 4.
Figure 6 is a schematic view illustrating the circuit connections for the various elements of the reflex klystron tube.
Figure 7 illustrates curves to show the movements of the suppressor probe.

The circuit diagram of Figure 6 illustrates electrical connections to elements of the reflux klystron tube, and to external sources of current. The various parts have been simplified and illustrated schematically to facilitate explanation of the complete circuit.

The elements of the klystron tube include the cathode 51 which is associated with the heater 52, the control grid 53, the resonator grids 54 and 55, and the repeller 56. A source of current 57 has its positive side connected to the cathode 51, and is connected to repeller 56 through the potentiometer 58. A battery or other voltage source 59 has its positive side connected to the external grounded conductor of the resonator, and its negative side connected to the cathode. The grids 54 and 55 are respectively connected to the external and central conductors of the resonator. The control grid 53 is connected to the cathode or negative side of voltage source 59 through resistor 60, and is also connected to the positive side of the source of bearing voltage 61.

Operation of the circuit shown in Figure 6 is known to those skilled in the art and need not be described. It will be evident that the voltages applied to the control grid 53 and the reflector 56 should be adjusted for stable oscillation on the ¾ wavelength cavity mode, for the various positions of the plunger. The output wavelength varies with the effective length of the cavity, but this is an approximate rather than an exact proportionality due to such factors as corner effects, presence of the klystron tube in the cavity, etc.

As shown particularly in Figure 2, tubular fittings 63 and 64 are carried by the walls 10, and afford passages 66 and 67 to facilitate introduction of coupling means for supplying energy to an external load, or for introduction of devices such as voltage attenuators, filter sections, or the like.

The curve of Figure 7 will afford a better understanding of the motion of the suppressor probe relative to the positioning of the plunger. In this figure the position of the cavity plunger for full frequency range adjustment has been plotted on the horizontal axis, and the position of the suppressor probe relative to the plunger plotted on the vertical axis. Curve 1 represents positioning of the probe relative to the cavity plunger. The portion 1*a* of this curve is parallel to the base line, and represents fixed positioning of the probe with respect to the cavity plunger for adjustments of the cavity plunger over the distance *a*. The curb portion 1*b* represents the retraction of the probe for movement of the cavity plunger over the distance *b*. For adjustments of the plunger over the distance *c*, the probe is fully retracted within the recess 43.

For operation with the plunger positioned within the limits $a$, the probe is effective to suppress the 5/4 wavelength cavity mode. When the plunger moves beyond the limits of the space $a$, the probe, although moving progressively toward the plunger face, as the plunger moves toward the forward end of the cavity is still effectively suppressing undesired 5/4 wavelength cavity mode, until it passes point $x$, beyond which point suppression is not required.

Curve 2 represents the ideal relationship which is approximated by curve 1. Curve 2 illustrates a gradual shifting of the position of the probe relative to the face of the plunger, over the distance $a$ plus that portion of distance $b$ occupied by the ideal curve 2, that is, distance $a$ plus any further distance until point $x$ is reached, beyond which point suppression is not required. For such plunger movements, the probe remains at a distance from the face of the plunger equal to one-quarter of the undesired 5/4 cavity mode wavelength, in contrast with the approximation of curve 1 where this 1/4 wavelength proportionality is not maintained at all points. While theoretically desirable, it has been found that such gradual retraction or shortening of the distance between the probe and the face of the plunger, as the plunger is advanced for higher frequencies of operation, is not necessary for good stable operation, and that an acceptable operation with the desired suppression of the 5/4 wavelength cavity mode is obtained by the approximation of curve 1.

As an example of actual practice, we have obtained good results with a cavity having a spacing of 1.77 centimeters between the walls 16, and with each wall having an over-all width (between walls 16) of 7.6 centimeters.

The distance of movement of the cavity plunger 17 for a frequency variation of from 4000 to 8000 megacycles was 3.3 centimeters. In its most forward operating position the effective front of the cavity plunger was 1.8 centimeters from the opposed face of the wall 12. The probe pin 36 was spaced 3 millimeters from the side of the center conductor 11, and was disposed 9 millimeters from the effective front face of the cavity plunger for the position illustrated in Figure 1. The plunger had a movement of 1.1 centimeters for distance $a$, 1.0 centimeter for distance $b$, during which the probe retracted, and 1.2 centimeters for distance $c$ with full retraction of the probe. Approximately, the frequency range for adjustment over distance $a$ was 4000 to 5000 megacycles, for adjustment over distance $b$, 5000 to 6000 megacycles, and for adjustment over distance $c$, 6000 to 8000 megacycles.

It will be evident from the foregoing that we have provided a high frequency generator capable of stable operation over a wide range of frequencies, and without cavity mode interference. The construction and arrangement of the parts is greatly facilitated because of use of a cavity resonator of the slab type as described, particularly in that this affords ample space on one side of the center conductor for accommodating the probe 36, and the parts associated with the same.

We claim:

1. In a high frequency electrical generator, a reflex klystron vacuum tube having cathode, control and resonator grids and a repeller, a cavity resonator coupled to the tube for generation of high frequency, and including an outer conductor forming sides of a cavity, one end of the cavity resonator being formed by a conductive plunger adjustable longitudinally of the same to change the frequency of operation, and means carried by said plunger to suppress an undesired cavity mode, said means comprising a probe formed of material capable of dissipating high frequency energy, that end face of the plunger faced toward the interior of the cavity being formed to provide a recess serving to accommodate said probe, means mounting the probe for movement from one position in advance of the plunger and the recess for suppressing an undesired mode, to a retracted position within said recess, and means for effecting movement of said probe between said positions of the same responsive to adjustments of the plunger, said last means including a member adapted to engage and apply force to the probe to urge the same toward said retracted position responsive to advancing movement of the plunger toward the interior of the cavity to increase the frequency of operation.

2. In a high frequency electrical generator, a reflex klystron vacuum tube having cathode, control and resonator grids and a repeller, a cavity resonator including an outer conductor electrically connected to one resonator grid of the tube and a center conductor connected to the other resonator grid of the tube, one end of said cavity resonator being formed by a conductive plunger adjustable longitudinally of the same to change the frequency of operation, and means carried by said plunger to suppress an undesired cavity mode, said means comprising a probe formed of material capable of dissipating high frequency energy, a recess in the plunger serving to accommodate said probe, means mounting the probe on the plunger for movement from one position in advance of the plunger for suppressing an undesired mode, to a retracted position within said recess, and means for effecting automatic movement of said probe between said positions of the same responsive to adjustments of the plunger, said last means comprising a spring urged member disposed to engage said probe as the plunger is advanced into the cavity to thereby effect retraction of said probe into said recess.

3. A high frequency electrical generator comprising a reflex klystron vacuum tube having cathode, control and resonator grids and a repeller, a cavity resonator having an outer conductor connected to one resonator grid of the tube and a center conductor connected to the other resonator grid of the tube, said outer conductor including two slab-like substantially parallel conducting walls disposed upon opposite sides of the center conductor, a rectangular plunger fitted between said walls and having a central aperture to receive said center conductor, and cavity mode suppressing means disposed in that space formed between said walls on one side of the center conductor, said means including a probe and a mounting for the same carried by said plunger.

4. A high frequency electrical generator as in claim 3 in which said mounting for the probe permits movement of said probe from one limiting position in advance of the plunger to a second limiting position within a recess formed in the plunger face, together with spring means for urging said probe to said first named limiting position, and means for causing automatic retraction of said probe to said second named position as the plunger is advanced into the cavity, said last means including a member adapted to engage and apply force to the probe to urge the same toward said retracted position responsive to movement of the plunger in a direction to advance the same into the cavity.

5. A high frequency electrical generator comprising a reflex klystron vacuum tube having cathode, control and resonator grids and a repeller, a cavity resonator having an outer conductor connected to one resonator grid of the tube and a center conductor connected to the other resonator grid of the tube, said outer conductor including two slab-like parallel conducting walls disposed upon opposite sides of the center conductor, end walls secured to the slab-like walls and forming a mounting for the tube, and a rectangular plunger disposed between said walls and having a central aperture to receive said center conductor, said plunger being adjustable toward or away from said end wall to adjust the frequency of operation, the cavity space between said slab-like walls being generally rectangular in cross section, and cavity mode suppressing means electrically connected to the resonator and disposed within that part of the cavity space which extends laterally between said slab-like walls from one side of the center conductor.

6. A high frequency generator as in claim 5 in which said cavity mode suppressing means includes a probe, means carried by the plunger for mounting said probe, said mounting means permitting limited movement of the probe relative to the plunger in a direction corresponding to the direction of extent of the axis of the center conductor, and means serving to move said mode suppressing means relative to the plunger in response to movements of the plunger relative to said end wall.

WILLIAM R. HEWLETT.
HOWARD M. ZEIDLER.

References Cited in the file of this patent

UNITED STATES PATENTS

| Number | Name | Date |
|---|---|---|
| 2,422,695 | McRae | June 24, 1947 |
| 2,436,397 | Morton | Feb. 24, 1948 |
| 2,450,026 | Tomlin | Sept. 28, 1948 |
| 2,504,329 | Heising | Apr. 18, 1950 |